United States Patent
Watanabe

(10) Patent No.: US 10,781,820 B2
(45) Date of Patent: Sep. 22, 2020

(54) TURBO-MOLECULAR PUMP

(71) Applicant: SHIMADZU CORPORATION, Kyoto (JP)

(72) Inventor: Kota Watanabe, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 182 days.

(21) Appl. No.: 16/050,363

(22) Filed: Jul. 31, 2018

(65) Prior Publication Data

US 2019/0055949 A1    Feb. 21, 2019

(30) Foreign Application Priority Data

Aug. 15, 2017  (JP) ................. 2017-156798

(51) Int. Cl.

| F04D 19/04 | (2006.01) |
| F04D 29/64 | (2006.01) |
| F16L 19/02 | (2006.01) |
| F16L 15/00 | (2006.01) |
| F04D 29/26 | (2006.01) |

(Continued)

(52) U.S. Cl.
CPC .......... *F04D 19/042* (2013.01); *F04D 19/04* (2013.01); *F04D 29/644* (2013.01); *F16L 15/008* (2013.01); *F16L 19/0212* (2013.01); *F04D 29/053* (2013.01); *F04D 29/058* (2013.01); *F04D 29/102* (2013.01); *F04D 29/122* (2013.01); *F04D 29/266* (2013.01); *F04D 29/662* (2013.01); *F05B 2240/51* (2013.01); *F05B 2240/57* (2013.01); *F05B 2260/301* (2013.01); *F16C 2360/45* (2013.01)

(58) Field of Classification Search
CPC ...... F04D 19/04; F04D 19/042; F04D 29/644; F16L 19/0212; F16L 15/008
See application file for complete search history.

(56) References Cited

U.S. PATENT DOCUMENTS 2,396,005 A * 3/1946 Gross .................... F16B 43/001
                                                              411/371.1
3,877,546 A * 4/1975 Shrader .................. F16N 7/366
                                                              184/6.18

(Continued)

FOREIGN PATENT DOCUMENTS

| CN | 2198459 U  | 5/1995 |
| EP | 1666730 A1 | 6/2006 |

(Continued)

OTHER PUBLICATIONS

Chinese Office Action for corresponding Application No. 2018108667473 dated Dec. 23, 2019, with English language translation.

(Continued)

*Primary Examiner* — Peter J Bertheaud
(74) *Attorney, Agent, or Firm* — Renner, Otto, Boisselle & Sklar, LLP

(57) ABSTRACT

A turbo-molecular pump comprises: a shaft to be rotatably driven by a motor; a pump rotor; multiple bolts penetrating the pump rotor from a pump suction port side to fasten the pump rotor to a pump suction port side end portion of the shaft; and a seal member configured to seal a clearance between fastening surfaces of the pump rotor and the shaft or a clearance between each bolt and the pump rotor.

5 Claims, 8 Drawing Sheets

(51) Int. Cl.
*F04D 29/12* (2006.01)
*F04D 29/66* (2006.01)
*F04D 29/10* (2006.01)
*F04D 29/058* (2006.01)
*F04D 29/053* (2006.01)

(56) References Cited

U.S. PATENT DOCUMENTS

| | | | |
|---|---|---|---|
| 6,290,457 B1* | 9/2001 | Kabasawa | F04D 19/042 |
| | | | 415/222 |
| 6,840,736 B2* | 1/2005 | Ohtachi | F04D 29/668 |
| | | | 415/119 |
| 7,390,164 B2* | 6/2008 | Maejima | F04D 19/04 |
| | | | 415/104 |
| 9,512,848 B2* | 12/2016 | Bottomfield | F04D 19/042 |
| 9,926,792 B2* | 3/2018 | Tsutsui | F01D 5/288 |
| 2007/0031270 A1 | 2/2007 | Maejima et al. | |

FOREIGN PATENT DOCUMENTS

| EP | 1666731 A1 | 6/2006 |
|---|---|---|
| JP | 5-321878 A | 12/1993 |
| JP | 2008-038844 A | 2/2008 |

OTHER PUBLICATIONS

Chinese Office Action for corresponding Application No. 2018108667473 dated Jun. 22, 2020, with English language translation.

* cited by examiner

ENLARGED VIEW
OF PORTION B

C-C SECTIONAL VIEW

TURBO-MOLECULAR PUMP

BACKGROUND OF THE INVENTION

1. Technical Field

The present invention relates to a turbo-molecular pump.

2. Background Art

In a turbo-molecular pump, a rotor shaft fastened to a pump rotor is rotated at high speed by a motor, thereby performing vacuum pumping. When the pump rotor rotates at high speed, a suction port side upstream of the pump rotor is under high vacuum. Exhausting is performed by a back pump on a back pressure side downstream of the pump rotor, and the back pressure side is under a low-vacuum pressure dependent on performance of the back pump.

The rotor shaft is provided on the back pressure side. Thus, when part of a fastening portion between the pump rotor and the rotor shaft is exposed on the suction port side and the back pressure side, gas leaks from the back pressure side to the suction port side through a clearance of the fastening portion. Such leakage might lead to a decrease in a compression ratio of the turbo-molecular pump and lowering of vacuum pumping performance.

In a turbo-molecular pump described in Patent Literature 1 (JP-A-5-311878), a rotor shaft and a pump rotor form a tapered fitting portion. For preventing leakage through the fitting portion, a structure is employed, in which a lid-shaped member configured to cover a rotor shaft end portion is attached to the pump rotor and a clearance between the lid-shaped member and the pump rotor is sealed by a gasket.

Meanwhile, in a turbo-molecular pump described in Patent Literature 2 (JP-A-2008-038844), a pump rotor is fastened to a rotor shaft by means of multiple bolts. For further facilitating assembly, a configuration is employed, in which a bolt penetrates a fastening portion of the pump rotor from a high vacuum side such that bolting from a suction port side is allowed.

However, in the case of the fastening structure as described in Patent Literature 2, a bolt hole formed at the pump rotor penetrates to a surface to be fastened to the rotor shaft. Thus, there is a probability that gas on a back pressure side leaks to the suction port side through a clearance between fastening surfaces of the pump rotor and the rotor shaft and a clearance between the bolt and the bolt hole.

SUMMARY OF THE INVENTION

A turbo-molecular pump comprises: a shaft to be rotatably driven by a motor; a pump rotor; multiple bolts penetrating the pump rotor from a pump suction port side to fasten the pump rotor to a pump suction port side end portion of the shaft; and a seal member configured to seal a clearance between fastening surfaces of the pump rotor and the shaft or a clearance between each bolt and the pump rotor.

The seal member is an O-ring seal arranged in a seal groove formed by a tapered surface formed at a pump suction port side edge of a bolt hole of the pump rotor, an outer peripheral surface of each bolt, and a bolt head of each bolt, and configured to contact each of the tapered surface, the outer peripheral surface, and the bolt head to seal the clearance between each bolt and the pump rotor.

The turbo-molecular pump further comprises: a rotor balance correction member fixed to the pump suction port side of the pump rotor. The bolts penetrate the rotor balance correction member and the pump rotor from the pump suction port side to fasten the rotor balance correction member and the pump rotor to the pump suction port side end portion of the shaft, and the seal member is an O-ring seal arranged in a seal groove formed by a fastening surface of one of the rotor balance correction member or the pump rotor, a tapered surface formed at an edge of a bolt hole of a fastening surface of the other one of the rotor balance correction member or the pump rotor, and an outer peripheral surface of each bolt, and configured to contact each of the fastening surface of the one of the rotor balance correction member or the pump rotor, the tapered surface, and the outer peripheral surface to seal the clearance between each bolt and the pump rotor.

The seal member is an O-ring seal attached to an inner periphery of a bolt hole of the pump rotor or an outer periphery of a bolt shaft of each bolt.

The seal member is arranged to collectively surround the multiple bolts to seal the clearance between the fastening surfaces of the pump rotor and the shaft.

The seal member is provided to surround each of the multiple bolts to seal the clearance between the fastening surfaces of the pump rotor and the shaft.

The seal member is a plate-shaped metal gasket.

According to the present invention, gas leakage from a back pressure side to a pump suction port side through a clearance between a bolt for fastening a pump rotor and the pump rotor can be prevented.

DETAILED DESCRIPTION OF THE EXEMPLARY EMBODIMENTS

Hereinafter, embodiments of the present invention will be described with reference to the drawings.

First Embodiment

Figure 1:
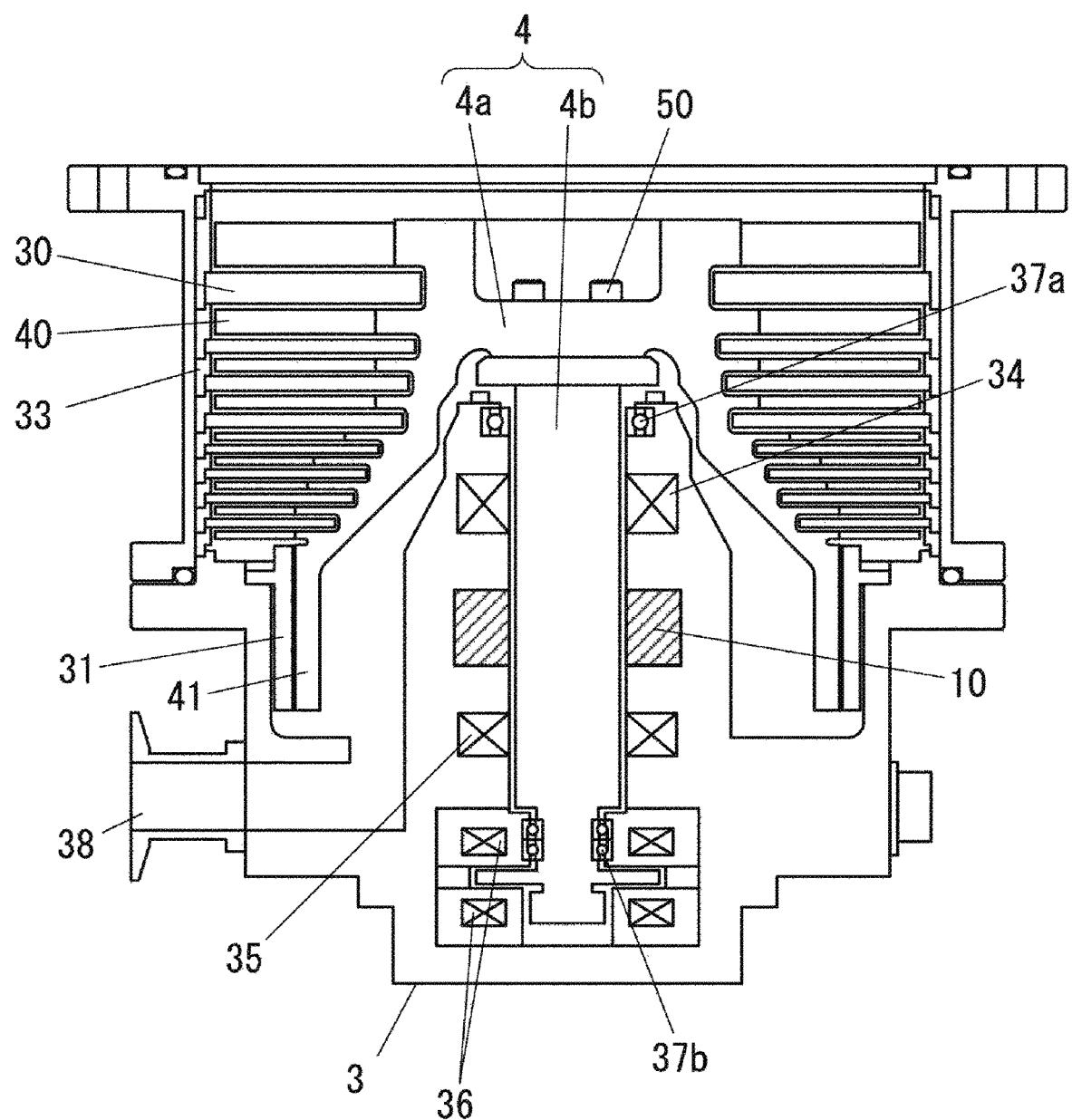
FIG. 1 is a sectional view of one example of a turbo-molecular pump.

FIG. 1 is a sectional view of one example of a turbo-molecular pump 1. Note that in the present embodiment, a magnetic bearing turbo-molecular pump will be described by way of example, but the present invention is applicable without limitation to a magnetic bearing type. The turbo-molecular pump 1 has a turbo pump stage including rotor blades 40 and stationary blades 30, and a screw groove pump stage including a cylindrical portion 41 and a stator 31. In the screw groove pump stage, a screw groove is formed at the stator 31 or the cylindrical portion 41. The rotor blades 40 and the cylindrical portion 41 are formed at a pump rotor 4a. The pump rotor 4a is fastened to a shaft 4b as a rotor shaft by multiple bolts 50. The pump rotor 4a and the shaft 4b are integrally fastened together by the bolts 50, thereby forming a rotary body 4.

Multiple stages of the rotor blades 40 and multiple stages of the stationary blades 30 are alternately arranged in an axial direction. Each stationary blade 30 is stacked in the pump axial direction through spacer rings 33. The shaft 4b is non-contact supported by magnetic bearings 34, 35, 36 provided at a base 3. Although not specifically shown in the figure, each of the magnetic bearings 34 to 36 includes an electromagnet and a displacement sensor. A levitation position of the shaft 4b is detected by the displacement sensors.

The rotary body 4 configured such that the pump rotor 4a and the shaft 4b are bolted together is rotatably driven by a motor 10. When no magnetic bearings are in operation, the shaft 4b is supported by emergency mechanical bearings 37a, 37b. When the rotary body 4 is rotated at high speed by the motor 10, gas on a pump suction port side is sequentially exhausted by the turbo pump stage (the rotor blades 40, the stationary blades 30) and the screw groove pump stage (the cylindrical portion 41, the stator 31), and then, is discharged through an exhaust port 38.

Figure 2A:
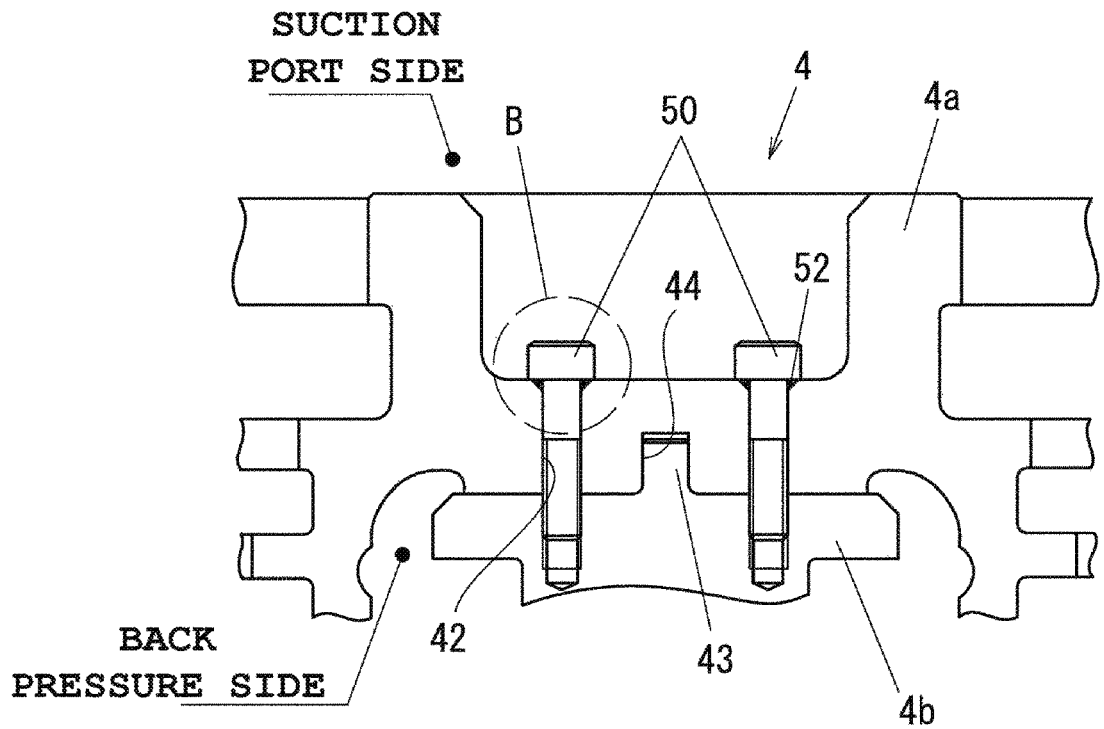
FIGS. 2A and 2B are views for describing a configuration of a fastening portion of a rotary body.
Figure 2B:
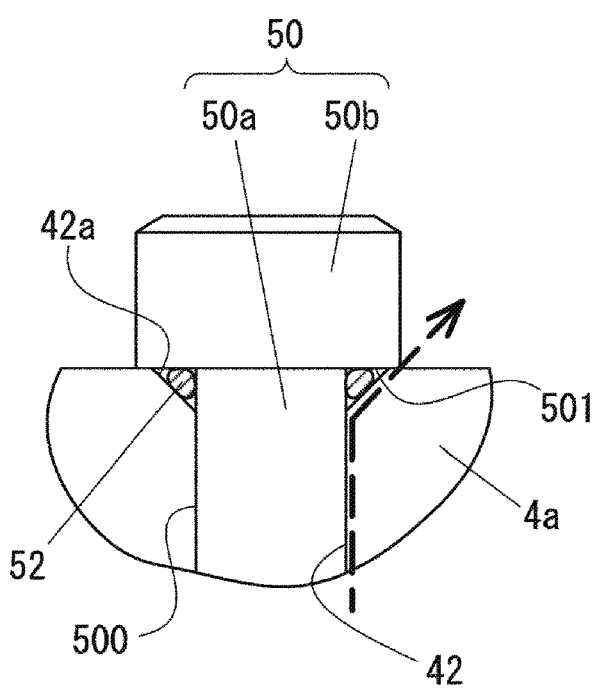

FIGS. 2A and 2B are views for describing a configuration of a fastening portion between the pump rotor 4a and the shaft 4b. FIG. 2A is a view of a bolting portion between the pump rotor 4a and the shaft 4b. As seen from FIG. 1, the fastening portion (fastening surfaces) between the pump rotor 4a and the shaft 4b is positioned on a back pressure side communicating with the exhaust port 38. The bolts 50 for fastening the pump rotor 4a to the shaft 4b are each inserted into bolt holes 42 of the pump rotor 4a from a suction port side thereof, and are screwed to the shaft 4b through the bolt holes 42. A raised portion 43 protruding from the fastening surface as an end surface of the shaft 4b is fitted in a recessed portion 44 formed at the fastening surface of the pump rotor, and in this manner, position determination between the pump rotor 4a and the shaft 4b is performed.

An O-ring seal 52 configured to seal a clearance between the bolt 50 and the pump rotor 4a is provided for each bolt 50. FIG. 2B is an enlarged view of a portion indicated by a reference numeral B. The O-ring seal 52 is arranged in a seal groove having a triangular section and formed by a tapered surface 42a formed at a suction port side edge of the bolt hole 42, an outer peripheral surface 500 of a bolt shaft 50a of the bolt 50, and a lower surface 501 of a bolt head 50b. When the bolt 50 is tightened, the O-ring seal 52 in the seal groove is compressed and deformed, and accordingly, comes into contact with the tapered surface 42a, the outer peripheral surface 500, and the lower surface 501. As a result, a clearance between the bolt 50 and the bolt hole 42 (i.e., the pump rotor 4a) is sealed by the O-ring seal 52.

As illustrated in FIG. 2A, the shaft 4b is on the back pressure side under low vacuum, and the bolt head 50b of the bolt 50 is on the suction port side under high vacuum. For example, in the case of providing no O-ring seal 52, gas on the back pressure side leaks to the high vacuum side through the clearance between the bolt 50 and the bolt hole 42 as indicated by a dashed arrow, and it leads to a decrease in a compression ratio.

On the other hand, in the present embodiment, the O-ring seal 52 is provided at each bolt 50 to seal the clearance between the bolt 50 and the bolt hole 42, and therefore, leakage from the back pressure side to the suction port side through the clearance between the bolt 50 and the bolt hole 42 can be prevented. Thus, a problem leading to a decrease in a compression ratio due to leakage can be solved.

(First Variation)

Figure 3A:
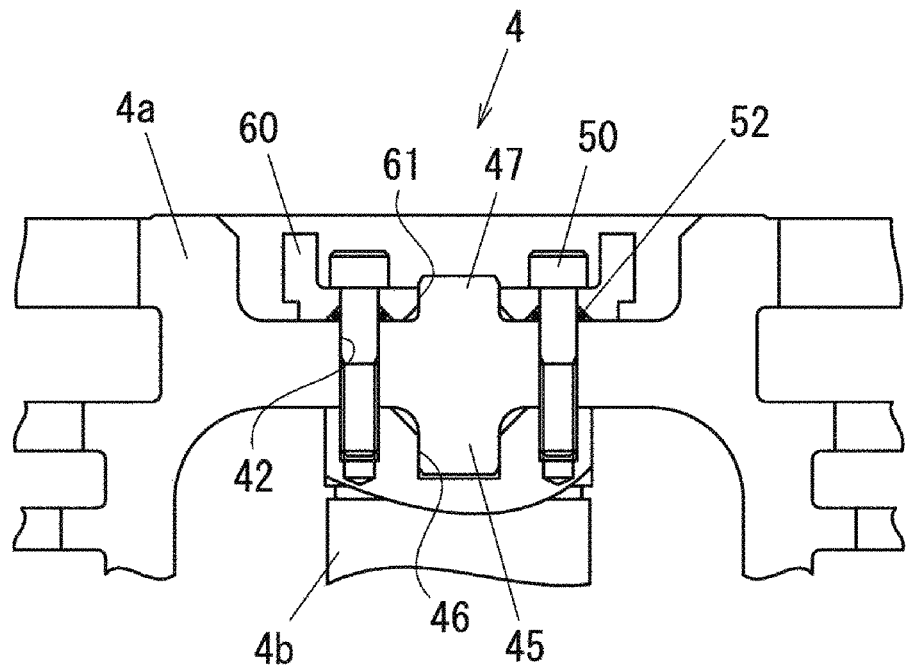
FIGS. 3A and 3B are views of a first variation.
Figure 3B:
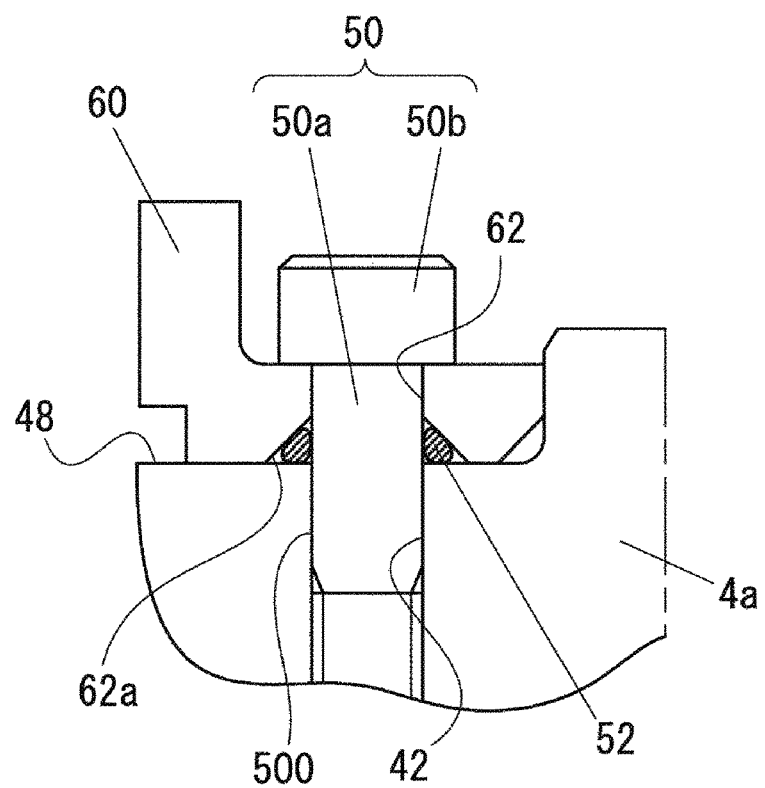

FIGS. 3A and 3B are views of a first variation of the above-described embodiment. In the first variation, a balance ring 60 used for unbalance correction for the rotary body 4 is provided at the rotary body 4. In a case where the rotary body 4 is unbalanced, unbalance correction is performed in such a manner that part of the balance ring 60 is removed by, e.g., drilling. In an example illustrated in FIGS. 3A and 3B, a raised portion 45 formed at a lower surface of the fastening portion of the pump rotor 4a is fitted in a recessed portion 46 of the shaft 4b, thereby determining the positions of the pump rotor 4a and the shaft 4b. Moreover, a raised portion 47 is formed at an upper surface of the fastening portion of the pump rotor 4a, and is fitted in a hole 61 of the balance ring 60 to determine the position of the balance ring 60 relative to the pump rotor 4a.

FIG. 3B is an enlarged view of details of a portion of the O-ring seal 52 provided at the fastening portion. The O-ring seal 52 is arranged in a seal groove having a triangular section and formed by a tapered surface 62a formed at a fastening surface side edge of a bolt hole 62 of the balance ring 60, the outer peripheral surface 500 of the bolt shaft 50a of the bolt 50, and a balance ring attachment surface 48 of the pump rotor 4a. When the pump rotor 4a and the balance ring 60 are fastened together by the bolts 50, the O-ring seal 52 in the seal groove is compressed and deformed, and accordingly, comes into contact with the tapered surface 62a, the outer peripheral surface 500, and the balance ring attachment surface 48. As a result, the clearance between the bolt 50 and the bolt hole 42 (i.e., the pump rotor 4a) is sealed by the O-ring seal 52, and therefore, gas leakage from the back pressure side to the suction port side through the clearance between the bolt 50 and the bolt hole 42 can be prevented.

Figure 4:
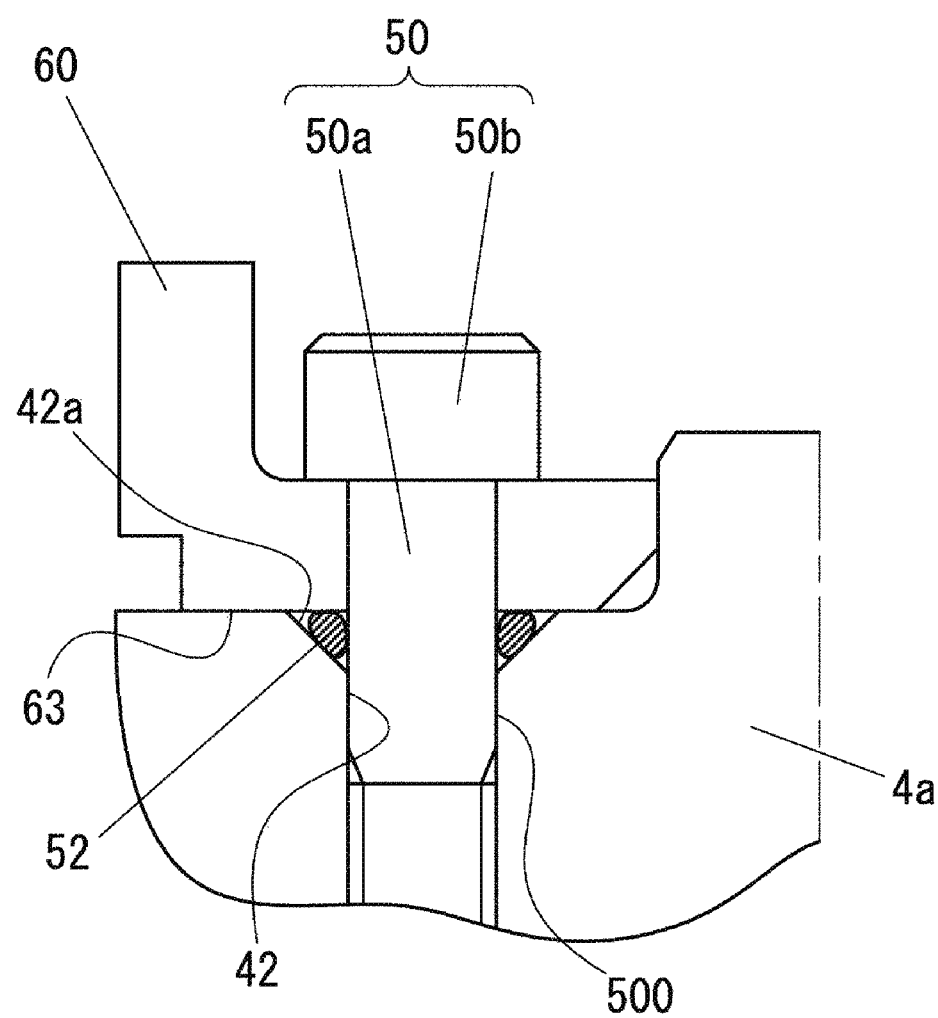
FIG. 4 is a view of a seal groove formed on a pump rotor side.

Note that in an example illustrated in FIGS. 3A and 3B, the seal groove in which the O-ring seal 52 is arranged and which has the triangular section is formed on a balance ring 60 side, but may be formed on a pump rotor 4a side as illustrated in FIG. 4. The seal groove is formed by the tapered surface 42a formed at the suction port side edge of the bolt hole 42, the outer peripheral surface 500 of the bolt shaft 50a, and a fastening surface (a lower surface) 63 of the balance ring 60.

When the balance ring 60 is fixed to the pump rotor 4a, the O-ring seal 52 in the seal groove is compressed and deformed, and accordingly, comes into contact with the tapered surface 42a, the outer peripheral surface 500, and the fastening surface 63 of the balance ring 60. As a result, the clearance between the bolt 50 and the bolt hole 42 (i.e., the pump rotor 4a) is sealed by the O-ring seal 52, and therefore, gas leakage from the back pressure side to the suction port side through the clearance between the bolt 50 and the bolt hole 42 can be prevented.

(Second Variation)

Figure 5A:
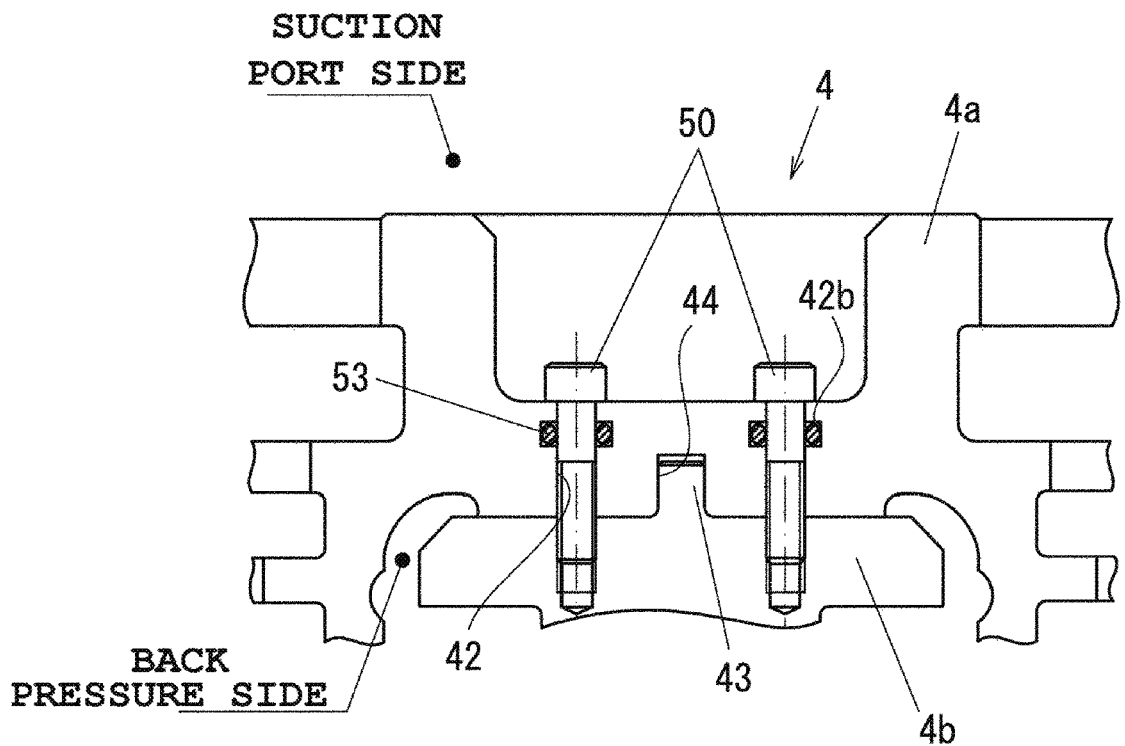
FIGS. 5A and 5B are views of a second variation.
Figure 5B:
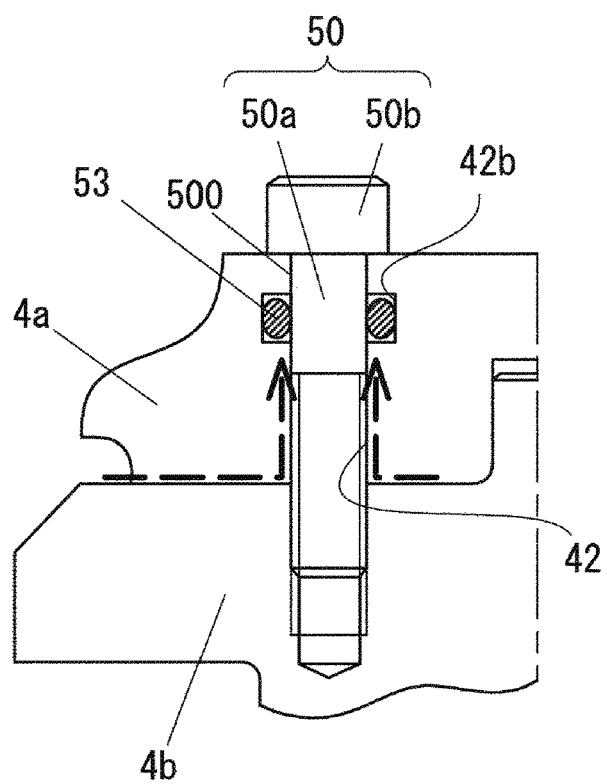

FIGS. 5A and 5B are views of a second variation. In the configuration illustrated in FIGS. 2A and 2B to 4, the clearance between the bolt 50 and the bolt hole 42 is sealed by the O-ring seal 52 arranged in the seal groove having the triangular section, but an O-ring seal 53 may be used as a shaft seal as illustrated in FIGS. 5A and 5B. FIG. 5A is a view of the fastening portion between the pump rotor 4a and the shaft 4b, and FIG. 5B is an enlarged view of a portion where the O-ring seal 53 is arranged.

An O-ring groove 42b in which the O-ring seal 53 is arranged is formed at an inner peripheral surface of the bolt hole 42 into which the bolt 50 is inserted. The O-ring seal 53 contacts the outer peripheral surface 500 of the bolt 50 and a groove bottom surface of the O-ring groove 42b, thereby sealing the clearance between the bolt 50 and the bolt hole 42. Thus, even when gas on the back pressure side on which the shaft 4b is provided enters the clearance between the bolt 50 and the bolt hole 42 as indicated by a dashed arrow of FIG. 5B, leakage to the suction port side is prevented by the O-ring seal 53.

Note that in an example illustrated in FIGS. 5A and 5B, the O-ring seal 53 is arranged in the O-ring groove formed at the bolt hole 42, but it may be configured such that the O-ring groove is formed on a bolt shaft 50a side of the bolt 50. Note that no balance ring 60 is provided in the example illustrated in FIGS. 5A and 5B, but the balance ring 60 may be provided.

Second Embodiment

Figure 6A:
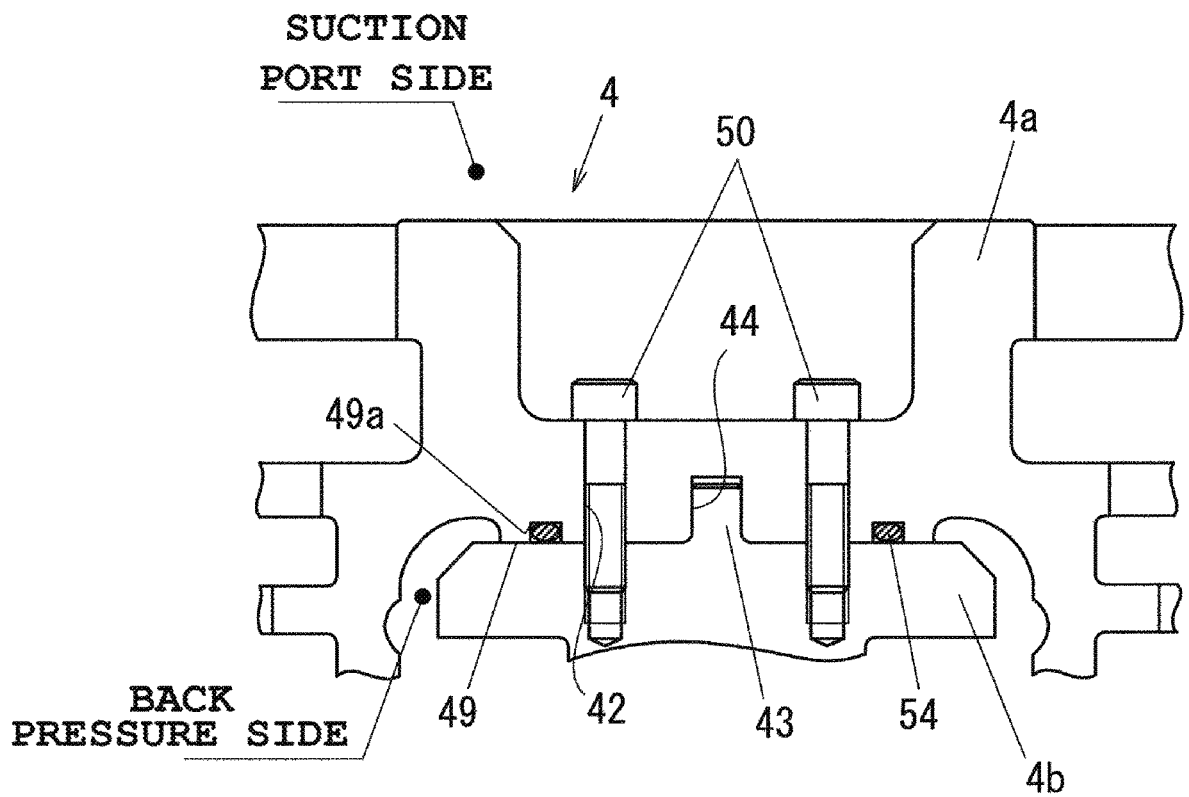
FIGS. 6A and 6B are views of a second embodiment.
Figure 6B:
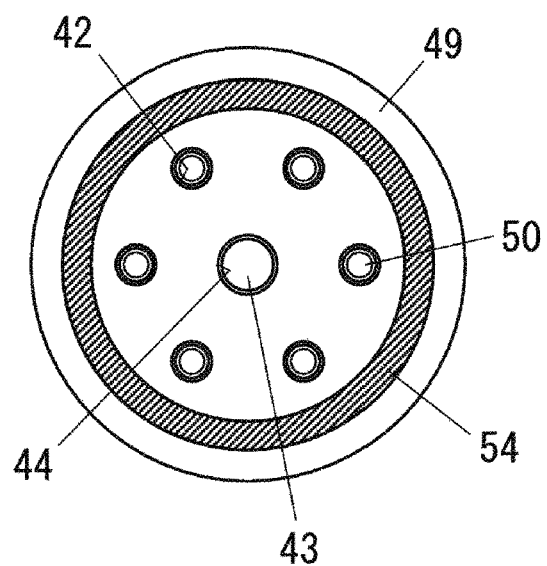

FIGS. 6A and 6B are views of a second embodiment. FIG. 6A is a view of a fastening portion between a pump rotor 4a and a shaft 4b as in the case of FIG. 2A. In the above-described first embodiment, the clearance between the bolt 50 for fastening the pump rotor 4a to the shaft 4b and the bolt hole 42 (i.e., the pump rotor 4a) is sealed by a seal member (the O-ring seal 52, 53), and in this manner, gas leakage from the back pressure side to the suction port side is prevented.

On the other hand, in the second embodiment, an O-ring seal 54 is provided at a fastening surface between the pump rotor 4a and the shaft 4b as illustrated in FIGS. 6A and 6B, thereby preventing gas entrance from a back pressure side into a bolt hole 42. Consequently, gas leakage from the back pressure side to a suction port side through a clearance between a bolt 50 and the bolt hole 42 is prevented.

FIG. 6B is a view of a fastening surface 49 of the pump rotor 4a from a shaft 4b side. The pump rotor 4a is fastened to the shaft 4b by six bolts 50, and therefore, six bolt holes 42 are formed at the fastening surface 49 of the pump rotor 4a. The O-ring seal 54 is arranged in such a circular ring shape that the O-ring seal 54 collectively surrounds all of these bolt holes 42 (i.e., the bolts 50). Thus, a clearance between the fastening surfaces of the pump rotor 4a and the shaft 4b is sealed by the O-ring seal 54, and therefore, gas entrance into the clearance between the bolt hole 42 and the bolt 50 from the back pressure side can be prevented. Consequently, gas leakage from the back pressure side to the suction port side can be prevented. Moreover, gas leakage from the back pressure side to the suction port side can be prevented by the single O-ring seal 54 regardless of the number of bolts.

Note that in an example illustrated in FIG. 6A, an O-ring groove 49a in which the O-ring seal 54 is arranged is formed at the fastening surface 49 of the pump rotor 4a, but may be formed on the shaft 4b side. In either case, the O-ring seal 54 seals the clearance between the fastening surfaces of the pump rotor 4a and the shaft 4b.

Figure 7A:
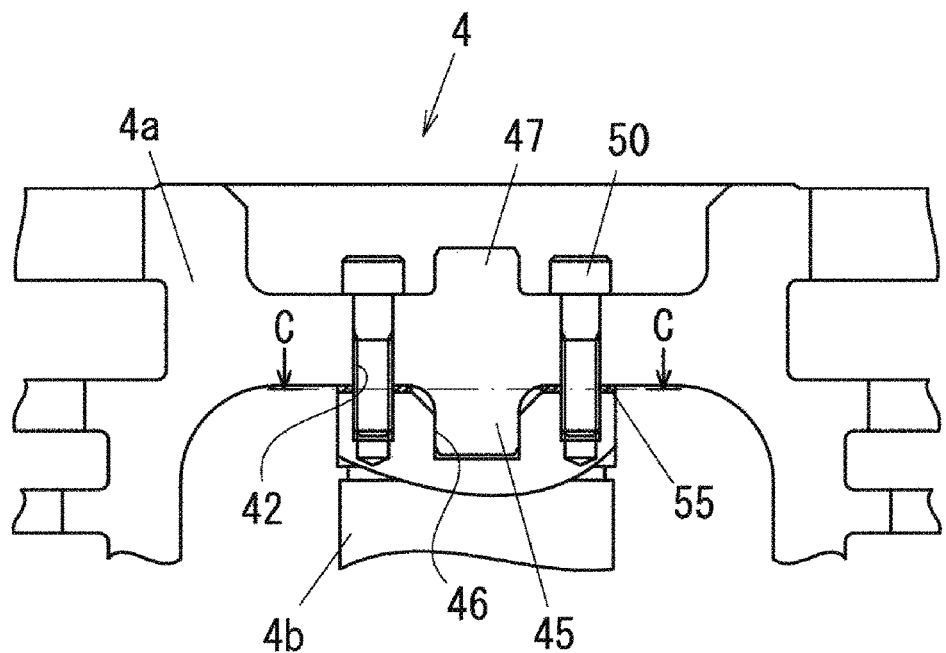
FIGS. 7A and 7B are views in the case of using a metal gasket.
Figure 7B:
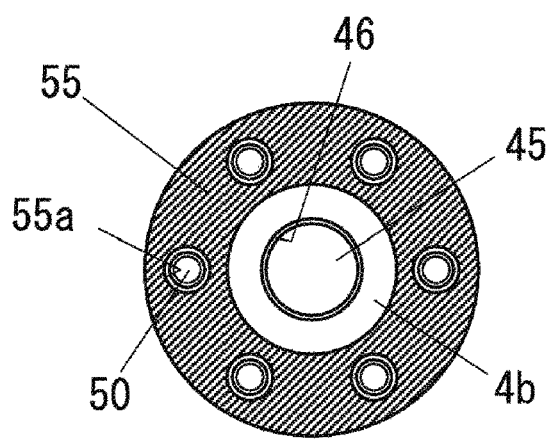

FIGS. 7A and 7B illustrate a case where a metal gasket 55 is, instead of the O-ring seal 54, used as the seal member configured to seal the clearance between the fastening surfaces of the pump rotor 4a and the shaft 4b. FIG. 7A is a view of the fastening portion between the pump rotor 4a and the shaft 4b, and FIG. 7B is a C-C sectional view. For example, easily-plastically-deformable metal (e.g., copper or aluminum) in a thin plate shape is used as the metal gasket 55. Six holes 55a through which the bolts 50 penetrate are formed at the ring-shaped metal gasket 55.

When the metal gasket 55 is arranged on the fastening surface (an upper end surface as viewed in the figure) of the shaft 4b and the pump rotor 4a is fastened to the shaft 4b by the bolts 50, a clearance between the pump rotor 4a and the shaft 4b is sealed by the metal gasket 55. In the case of a fastening structure illustrated in FIGS. 7A and 7B, a space between an outer peripheral surface of the shaft 4b and the bolt 50 is small, and therefore, there is no space for arrangement of the O-ring seal 54 illustrated in FIGS. 6A and 6B. In this case, the metal gasket is preferably used as the seal member. Note that a non-metal gasket can be used instead of the metal gasket 55, but the metal is preferable considering, e.g., gas emission from a material and heat resistance.

Note that in the examples illustrated in FIGS. 6A, 6B, 7A, and 7B, no balance ring 60 is provided, but the balance ring 60 may be provided.

Figure 8A:
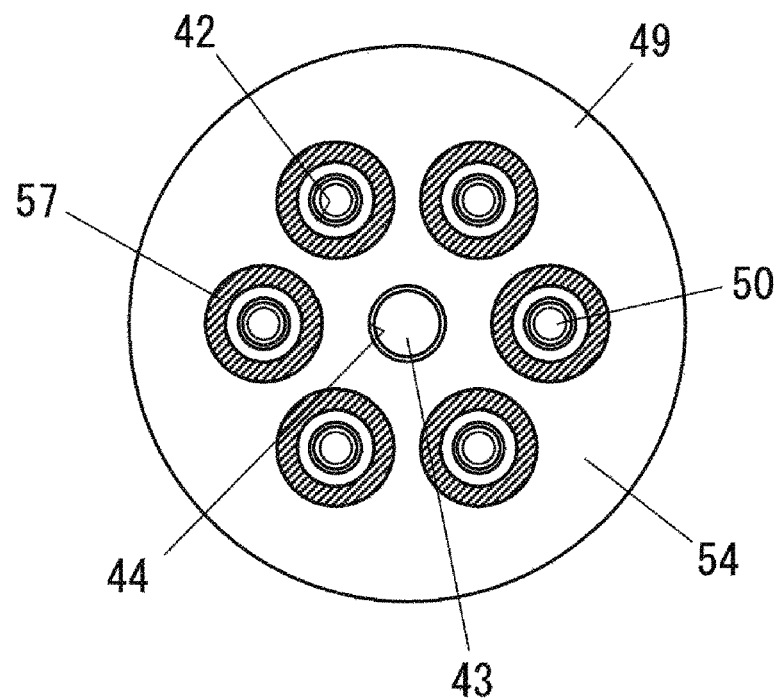
FIGS. 8A and 8B are views of variations of the second embodiment.
Figure 8B:
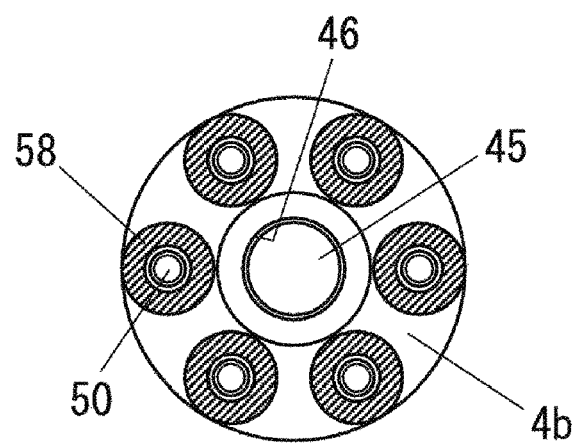

FIGS. 8A and 8B are views of variations of the second embodiment. In the case of the O-ring seal 54 or the metal gasket 55 as illustrated in FIGS. 6A, 6B, 7A, and 7B, the seal member is arranged to collectively surround all of six bolts 50. On the other hand, in the variations illustrated in FIGS. 8A and 8B, the seal member provided to surround the single bolt 50 is arranged for each bolt 50.

FIG. 8A illustrates the case of using an O-ring seal 57, and the O-ring seal 57 is arranged for each bolt 50. FIG. 8B illustrates the case of applying the metal gasket, and a ring-shaped metal gasket 58 is provided for each bolt 50. The clearance between the bolt hole 42 and the bolt 50 is connected to the back pressure side through the clearance between the fastening surfaces of the pump rotor 4a and the shaft 4b. However, the seal member is provided for each bolt 50 as described above. Thus, the clearance between the fastening surfaces of the pump rotor 4a and the shaft 4b around the bolts 50 can be sealed, and gas entrance from the back pressure side into the clearance between the bolt hole 42 and the bolt 50 can be prevented. As a result, gas leakage from the back pressure side to the suction port side through the clearance between the bolt hole 42 and the bolt 50 can be prevented.

According to the above-described embodiments, the following features and advantageous effects are obtained.

(C1) As illustrated in, e.g., FIGS. 5A, 5B, 6A, and 6B, in the turbo-molecular pump 1, the pump rotor 4a is fastened to the pump suction port side end portion of the shaft 4b by means of the multiple bolts 50 penetrating the pump rotor 4a from the pump suction port side. Moreover, the O-ring seal 54 as the seal member seals the clearance between the fastening surfaces of the pump rotor 4a and the shaft 4b as in FIGS. 6A and 6B, or the O-ring seal 53 seals the clearance between the bolt 50 and the bolt hole 42 of the pump rotor 4a as in FIGS. 5A and 5B. With this configuration, gas leakage from the back pressure side on which the shaft 4b is arranged to the pump suction port side through the clearance between the bolt 50 and the pump rotor 4a can be prevented by the O-ring seal 54, 53.

(C2) For example, as in the fastening structure illustrated in FIGS. 2A and 2B, the O-ring seal 52 may be arranged in the seal groove having the triangular section and formed by the tapered surface 42a formed at the pump suction port side edge of the bolt hole 42 of the pump rotor 4a, the outer peripheral surface 500 of the bolt 50, and the bolt head 50b of the bolt 50, and may contact each of the tapered surface 42a, the outer peripheral surface 500, and the bolt head 50b to seal the clearance between the bolt 50 and the pump rotor 4a, i.e., the clearance between the bolt 50 and the bolt hole 42.

(C3) In the case of further providing, as in the fastening structure illustrated in FIGS. 3A, 3B, and 4, the balance ring 60 as a rotor balance correction member fixed to the pump suction port side of the pump rotor 4a, the O-ring seal 52 may be arranged in the seal groove having the triangular section and formed by the fastening surface (the fastening surface of the pump rotor 4a in the case of FIGS. 3A and 3B, and the fastening surface 63 of the balance ring 60 in the case of FIG. 4) of one of the balance ring 60 or the pump rotor 4a, the tapered surface (the tapered surface 62a in the case of FIGS. 3A and 3B, and the tapered surface 42a in the case of FIG. 4) formed at the edge of the bolt hole of the fastening surface of the other one of the balance ring 60 or the pump rotor 4a, and the outer peripheral surface 500 of the bolts 50, and may contact each of the one fastening surface, the tapered surface, and the outer peripheral surface 500 to seal the clearance between the bolt 50 and the pump rotor 4a, i.e., the clearance between the bolt 50 and the bolt hole 42.

(C4) As in the case of the fastening structure illustrated in FIGS. 5A and 5B, the O-ring seal 53 may be attached to the inner periphery of the bolt hole 42 of the pump rotor 4a, thereby sealing the clearance between the bolt 50 and the pump rotor 4a, i.e., the clearance between the bolt 50 and the bolt hole 42. Alternatively, the O-ring seal 53 may be attached to the outer periphery of the bolt shaft 50a, and provides advantageous effects similar to those of the case of attachment to the inner periphery of the bolt hole 42.

(C5) As in the fastening structure illustrated in FIGS. 6A and 6B, the O-ring seal 54 may be arranged to collectively surround the multiple bolts 50, thereby sealing the clearance between the fastening surfaces of the pump rotor 4a and the shaft 4b. In this configuration, the clearance can be sealed by the single O-ring seal 54 regardless of the number of bolts.

(C6) As in the configuration illustrated in FIG. 8A, the O-ring seal 57 may be provided to surround each of the multiple bolts 50, thereby sealing the clearance between the fastening surfaces of the pump rotor 4a and the shaft 4b. In this manner, gas entrance from the back pressure side into the clearance between the bolt hole 42 and the bolt 50 may be prevented. As a result, gas leakage from the back pressure side to the pump suction port side can be prevented.

(C7) As illustrated in FIGS. 7A and 7B, the plate-shaped metal gasket 55 may be used as the seal member. With the metal gasket 55, gas emission from the seal member can be reduced as compared to the case of using the O-ring seal.

A variety of embodiments and variations has been described above, but the present invention is not limited to these contents. Other aspects conceivable within the scope of the technical idea of the present invention are also included in the scope of the present invention.

What is claimed is:

1. A turbo-molecular pump comprising:
a shaft to be rotatably driven by a motor;
a pump rotor;
multiple bolts penetrating the pump rotor from a pump suction port side to fasten the pump rotor to a pump suction port side end portion of the shaft; and
a seal member configured to seal a clearance between fastening surfaces of the pump rotor and the shaft or a clearance between each bolt and the pump rotor, wherein
the seal member is an O-ring seal
arranged in a seal groove formed by a tapered surface formed at a pump suction port side edge of a bolt hole of the pump rotor, an outer peripheral surface of each bolt, and a bolt head of each bolt, and
configured to contact each of the tapered surface, the outer peripheral surface, and the bolt head to seal the clearance between each bolt and the pump rotor.

2. A turbo-molecular pump comprising:
a shaft to be rotatably driven by a motor;
a pump rotor;
multiple bolts penetrating the pump rotor from a pump suction port side to fasten the pump rotor to a pump suction port side end portion of the shaft;
a seal member configured to seal a clearance between fastening surfaces of the pump rotor and the shaft or a clearance between each bolt and the pump rotor, and
a rotor balance correction member fixed to the pump suction port side of the pump rotor,
wherein the bolts penetrate the rotor balance correction member and the pump rotor from the pump suction port side to fasten the rotor balance correction member and the pump rotor to the pump suction port side end portion of the shaft, and
the seal member is an O-ring seal
arranged in a seal groove formed by a fastening surface of one of the rotor balance correction member or the pump rotor, a tapered surface formed at an edge of a bolt hole of a fastening surface of the other one of the rotor balance correction member or the pump rotor, and an outer peripheral surface of each bolt, and
configured to contact each of the fastening surface of the one of the rotor balance correction member or the pump rotor, the tapered surface, and the outer peripheral surface to seal the clearance between each bolt and the pump rotor.

3. A turbo-molecular pump comprising:
a shaft to be rotatably driven by a motor;
a pump rotor;
multiple bolts penetrating the pump rotor from a pump suction port side and into a pump suction port side end portion of the shaft to fasten the pump rotor to the pump suction port side end portion of the shaft, fastening surfaces between the pump rotor and the shaft being positioned on a back pressure side of the pump rotor communicating with an exhaust port; and
a seal member configured to seal a clearance between fastening surfaces of the pump rotor and the shaft or a clearance between each bolt and the pump rotor and to prevent leakage of a gas from the back pressure side to a suction port side,
wherein
the seal member is an O-ring seal attached to an inner periphery of a bolt hole of the pump rotor or an outer periphery of a bolt shaft of each bolt.

4. A turbo-molecular pump comprising:
a shaft to be rotatably driven by a motor;
a pump rotor;
multiple bolts penetrating the pump rotor from a pump suction port side and into a pump suction port side end portion of the shaft to fasten the pump rotor to the pump suction port side end portion of the shaft, fastening surfaces between the pump rotor and the shaft being positioned on a back pressure side of the pump rotor communicating with an exhaust port; and
a seal member configured to seal a clearance between fastening surfaces of the pump rotor and the shaft or a clearance between each bolt and the pump rotor and to prevent leakage of a gas from the back pressure side to a suction port side,
wherein
the seal member is arranged to collectively surround the multiple bolts to seal the clearance between the fastening surfaces of the pump rotor and the shaft, and
the seal member is a plate-shaped metal gasket.

5. A turbo-molecular pump comprising:

a shaft to be rotatably driven by a motor;

a pump rotor;

multiple bolts penetrating the pump rotor from a pump suction port side and into a pump suction port side end portion of the shaft to fasten the pump rotor to the pump suction port side end portion of the shaft, fastening surfaces between the pump rotor and the shaft being positioned on a back pressure side of the pump rotor communicating with an exhaust port; and a seal member configured to seal a clearance between fastening surfaces of the pump rotor and the shaft or a clearance between each bolt and the pump rotor and to prevent leakage of a gas from the back pressure side to a suction port side, wherein the seal member is provided to surround each of the multiple bolts to seal the clearance between the fastening surfaces of the pump rotor and the shaft, and the seal member is a plate-shaped metal gasket.

* * * * *